Dec. 4, 1962  U. BALDIOLI  3,066,598
PERCOLATOR FOR PREPARING INFUSIONS
Filed Sept. 12, 1960

Inventor
UGO BALDIOLI
By Irwin S. Thompson
Attorney

United States Patent Office

3,066,598
Patented Dec. 4, 1962

3,066,598
PERCOLATOR FOR PREPARING INFUSIONS
Ugo Baldioli, Omegna, Italy
Filed Sept. 12, 1960, Ser. No. 55,416
7 Claims. (Cl. 99—285)

The present invention relates to an improved percolator for preparing infusions, particularly of coffee, which makes it possible to prepare in a short time an excellent coffee using blends of the most varied composition and at any degree of roasting.

There is a great number of domestic coffee-pots available, and all of them answer more or less the purpose for which they have been designed, but all these coffee-pots have some defects and their performance is a good one when using well defined blends of coffee only. Most of those produced in Europe, for instance, have a satisfactory performance when using coffee-powder ground from seed which has undergone a long roasting process. While the performance is a poor one when using coffee powder obtained from seed which has undergone a light roasting process, this is common practice in the Americas and particularly in the United States. In any case in all the coffee-pots available coffee powder comes always in contact with water at a temperature exceeding 100° C. owing to the high pressure developed inside the percolator, or in some cases directly with steam. The infusion loses in both cases a great part of its aroma as the coffee powder is burnt by the high temperature either by water or by steam.

Object of the present invention is to provide a percolator having novel and improved details of construction and in which all of these defects are eliminated.

The main purpose of the invention is to provide a percolator in which coffee powder is free from contact of steam and in which water which comes in contact with the powder for obtaining the infusion, is at a temperature slightly lower than the boiling temperature (100° C.).

A further purpose is to provide a percolator which can secure an efficient and easy performance with any qualities of coffee powder, eliminating the danger of bursting or of other defects.

A further purpose of the present invention is to provide a percolator with said guarantees and provide a satisfactory operation without the use of safety valves.

A further purpose is to provide a percolator by which to prepare not only a coffee infusion, but any other kinds of infusion, such as tea and camomile, for example.

A further purpose is to provide a percolator with means apt to signal the infusion process from the beginning to the end.

A further purpose is finally to provide a percolator with confortable handling means which may be affected as little as possible by the action of the source of heat acting on the percolator.

The features of the present invention will be better understood by referring to the following detailed description, taken in connection with the accompanying drawings.

Figure 1:
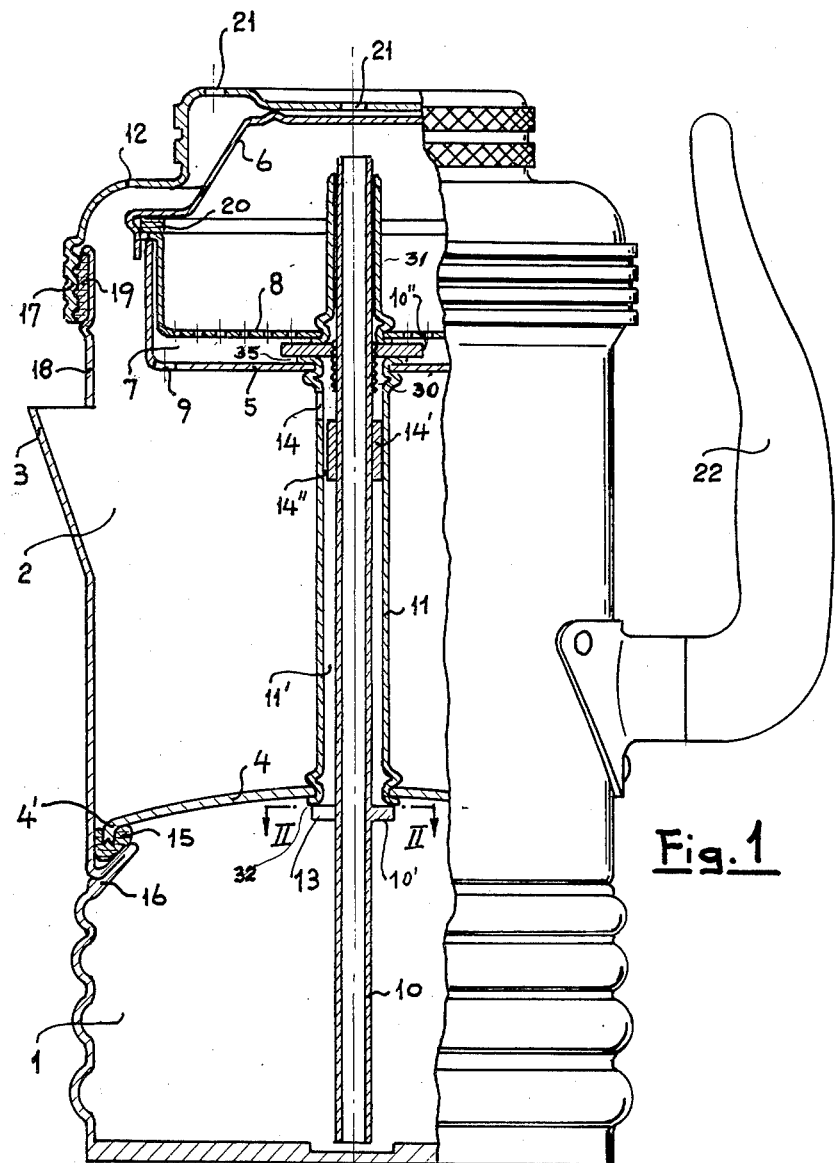
FIG. 1 is a side view having a portion of the percolator broken away.
Figure 2:
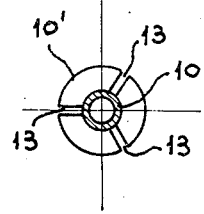
FIG. 2 shows a particular in a plan view taken along line II—II of FIG. 1.

1 is a water tank on which any source of heat, not represented, can act and 2 is an overlying container which acts as infusion container and which is provided with an outlet 3 for pouring out the infusion. The overlying container 2 is separated from the tank 1 by a wall 4 placed approximately at one third of the total height of the percolator starting from its bottom.

In the higher part of overlying container 2 a filter-carrying cup 5 is provided which is connected to the wall 4 by some means which will be described later on. This cup delimits, with a lid 6, a chamber 7 for the filter 8 and has in its lower surface a series of holes or peripheral slits 9, which makes possible the communication between the chamber 7 and the overlying container 2.

An axial duct 10 which makes a unit with the wall 4 and the cup 5 extends vertically in the center of the percolator from near the bottom of the tank 1 to the highest portion of the chamber 7, passing through the wall 4, the overlying container 2, the cup 5 and the filter 8.

The axial duct 10 is surrounded by a tubular jacket 11 which, extending from the wall 4 to the cup 5, connects the lower surface of the filter-carrying cup 5 with the wall 4 forming with them and with the axial duct a unit kept in place between the body of the percolator and the percolator lid 12, the unit being easily removable after removing percolator lid 12 from the percolator. The connection is made possible due to a ring 10' being secured to the duct 10 which presses against a flange 32 at the bottom of tubular jacket 11 to which wall 4 is connected and, by screwing a nut 10" on a corresponding thread 30 of the duct 10, against a flange 33 at the top of tubular jacket 11 to which filter-carrying cup 5 is connected. Filter 8 is connected to a tubular member 31 which fits over the top portion of duct 10, and the bottom portion of tubular member 31 abuts against nut 10".

The hollow space 11' between the duct 10 and the tubular jacket 11 communicates with the tank 1 by means of slots 13 in the ring 10' of duct 10, and with the overlying container 2 by means of slits 14 placed in said tubular jacket 11 approximately at the level of the outlet 3 just above an annular ring 14' which throttles the hollow space 11' and contains a number of peripheral narrow passages 14" extending axially on the ring itself.

In the embodiment of the present invention it has been found advantageous to provide an uneven number of slots 13 and of slits 14, the latter being preferably in number of three.

The wall 4 rests by means of its peripheral edge 4' on an elastic gasket 15 placed on an annular flange 16, of the body of the percolator. Because of this gasket the wall 4 secures a pressure seal with the flange 16, when the lower edge 17 of the percolator lid 12 provided with internal threads is fully screwed on the upper edge 18 of the body of the percolator, provided with an externally threaded gasket 19 made of nylon or a like material. The percolator lid 12, pressing the lid 6 of the filter-carrying cup, pushes down the unit composed of the wall 4, the filter-carrying cup 5, the duct 10 and the tubular jacket 11, compresses the gasket 15 between the edge 4' of said wall 4 and the flange 16. Gasket 20 provides a close seal between the cup 5 and its relative lid 6.

The overlying container 2 communicates with the atmosphere not only by means of the outlet 3, but by means of a series of holes 21 in the lid 12.

The percolator is provided with an L shaped handle 22 made of insulating material which projects laterally from the body at about the middle of its height and reaches the level of the top of the lid, thus being affected as little as possible by the action of the sources of heat in a reduced manner with respect to conventional handles and thereby facilitating the handling of the percolator.

The operation of the percolator is the following: the steam which has gathered on top of the water tank 1 during the application thereto of heat, makes hot water go up in the duct 10 until it reaches the top of it to flow henceforth on the contents of the filter 8, which may be for instance coffee powder, a part of the steam gathered infiltrating at the same time through the slots 13 in the hollow space 11', from which, passing through the passages 14" of the throttling ring 14' and the slits 14, comes out from the outlet 3 and from the holes 21 in the lid 12 of the percolator.

Passing through the passages 14" and the slits 14, the steam emits a whistle signaling the duration of the infusion-process from the beginning to the end. When the whistle stops it means that in the tank 1 there is no longer steam gathered, that is to say that all the unvaporized water contained in the tank 1 has gone in the chamber of the filter 8 thus obtaining the infusion and that it is time to stop the application of heat. The infusion can be drunk immediately.

As it is clear from the present description, there is no direct contact between steam and coffee powder, while the water which is poured on the coffee powder has a temperature lower than 100° C., partly this being due to the distance covered along the duct 10 and partly to the fact that the pressure developed inside the tank 1 never exceeds by much that of the external atmosphere with which it communicates indirectly by means of the slits 13, the hollow space 11', the passages 14", the slits 14, the outlet 3 and the holes 21, thus making the use of calibrated valves and the like superfluous and thereby eliminating any danger of bursting.

In view of my invention and disclosure, variations and modifications to meet particular needs will doubtless be possible, without departing from the scope of the present invention.

What I claim is:

1. A percolator for beverage preparation having a unit including a water tank and an overlying container for containing the beverage, said overlying container having a beverage outlet, said tank and overlying container being separated by a wall, a filter-carrying cup disposed in the upper part of said overlying container and being provided with holes in its bottom surface, a filter mounted inside said filter-carrying cup, a lid mounted on said filter-carrying cup, an axial duct which extends from near the bottom of said tank into said filter-carrying cup while passing through said wall, said overlying container, said filter-carrying cup and said filter, a tubular jacket surrounding said axial duct and forming therebetween within said overlying container a hollow space, said axial duct and tubular jacket being provided with passages interconnecting the highest portions of said tank, and said overlying container, through said hollow space, said axial duct, said wall, said tubular jacket and said filter-carrying cup forming a unit easily removable from said percolator, said axial duct being removable from said tubular jacket, said passages interconnecting said tank and said hollow space being radial slots disposed in a ring integral with said axial duct immediately below said wall while said passages interconnecting said hollow space and said overlying container are slots disposed on said tubular jacket above a throttling ring provided with narrow passages which throttles said hollow space, and a percolator lid movably mounted on the upper portion of said overlying container for the sealing thereof and for maintaining said unit in place.

2. The percolator of claim 1 in which said radial slots in the duct, said slits in the jacket and said narrow passages in the throttling ring are in an uneven number.

3. The percolator of claim 1 in which the wall which separates said overlying container from said tank, rests by means of its peripheral edge on an inner flange of the tank, a sealing gasket being interposed between said flange and said edge.

4. The percolator of claim 1 in which the percolator lid on said overlying container engages, when sealed, the lid of the filter-carrying cup to keep in place said cup and the unit to which said cup belongs.

5. The percolator of claim 4 in which percolator lid is sealed to said overlying container through a screw connection in which an external thread on the upper portion of said overlying container is grooved on a gasket of thermoplastic material secured to the upper portion of said overlying container.

6. The percolator of claim 1 which comprises a gasket, interposed between said filter-carrying cup and its lid.

7. The percolator of claim 1 being provided with an L shaped handle which, projecting laterally from the overlying container of the percolator at about the middle of its height, reaches approximately the level of the top of the percolator lid.

References Cited in the file of this patent

FOREIGN PATENTS

| 635,305 | France | Dec. 27, 1927 |
| 684,356 | France | Mar. 17, 1930 |
| 1,196,579 | France | May 25, 1959 |